United States Patent
Bellamkonda et al.

(10) Patent No.: US 7,469,241 B2
(45) Date of Patent: Dec. 23, 2008

(54) EFFICIENT DATA AGGREGATION OPERATIONS USING HASH TABLES

(75) Inventors: Srikanth Bellamkonda, Sunnyvale, CA (US); Benoit Dageville, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 253 days.

(21) Appl. No.: 11/156,068

(22) Filed: Jun. 17, 2005

(65) Prior Publication Data

US 2006/0116989 A1    Jun. 1, 2006

Related U.S. Application Data

(60) Provisional application No. 60/632,035, filed on Nov. 30, 2004.

(51) Int. Cl.
*G06F 7/00* (2006.01)
*G06F 17/30* (2006.01)

(52) U.S. Cl. .............. 707/2; 707/3; 707/10; 707/100; 707/101

(58) Field of Classification Search ............ 707/2, 707/3, 10, 100, 101
See application file for complete search history.

(56) References Cited

U.S. PATENT DOCUMENTS

| | | | | |
|---|---|---|---|---|
| 5,515,531 A | * | 5/1996 | Fujiwara et al. | 707/3 |
| 5,832,475 A | * | 11/1998 | Agrawal et al. | 707/2 |
| 6,226,639 B1 | * | 5/2001 | Lindsay et al. | 707/5 |
| 7,043,494 B1 | * | 5/2006 | Joshi et al. | 707/101 |
| 7,085,769 B1 | * | 8/2006 | Luo et al. | 707/102 |
| 2002/0099691 A1 | * | 7/2002 | Lore et al. | 707/2 |
| 2004/0172400 A1 | * | 9/2004 | Zarom et al. | 707/100 |
| 2004/0199516 A1 | * | 10/2004 | Thames et al. | 707/100 |
| 2005/0114862 A1 | * | 5/2005 | Bisdikian et al. | 718/105 |
| 2007/0083491 A1 | * | 4/2007 | Walmsley et al. | 707/3 |

OTHER PUBLICATIONS

Lane, Paul, et al., "Oracle Database Data Warehousing Guide, 10g Release 1 (10.1)," Oracle, Dec. 2003, 806 pages. (reference provided on enclosed CD-ROM).

Moore, Valarie, et al., "Oracle Database Performance Tuning Guide, 10g Release 1 (10.1)," Oracle, Dec. 2003, 572 pages. (reference provided on enclosed CD-ROM).

(Continued)

*Primary Examiner*—Khanh B. Pham
*Assistant Examiner*—Usmaan Saeed
(74) *Attorney, Agent, or Firm*—Hickman Palermo Truong & Becker LLP (57) ABSTRACT

Hash aggregation operates in two phases. In the first phase, data read from underlying row source is partitioned on GROUP BY keys with on-the-fly aggregation. It is determined into which partition an entry corresponding to the incoming record should be grouped, and whether a matching entry is already present in the partition, using a hash function and a hash table built for the partition. For aggregation operations, if a match is found, then a measure value from the incoming record is aggregated with a measure value for the entry existing in the partition. If there is not enough system volatile memory to complete the first phase, then a partition is selected for storing persistently. Thus, only one partition at a time is stored persistently, as necessary. In the second phase, one persistently stored partition is processed at a time, whereby aggregation of the data in that partition is completed and results are returned.

24 Claims, 4 Drawing Sheets

OTHER PUBLICATIONS

Alexander Chigrik, "SQL Server 7.0: Hash Joins," Sep. 7, 2000, www.databasejournal.com/features/mssql/article.php/a443301 p. 1-4.

Oracle8/Data Warehousing Guide, Release 2 (8.1.6), Part No. A76994-01, "Parallelism and Partitioning," Dec. 1999, 17 pages.

* cited by examiner

EFFICIENT DATA AGGREGATION OPERATIONS USING HASH TABLES

CROSS-REFERENCE TO RELATED APPLICATION

This application is related to and claims the benefit of priority from U.S. Provisional Patent Application No. 60/632,035 filed on Nov. 30, 2004 by Srikanth Bellamkonda and Benoit Dageville, entitled "Efficient Data Aggregation In A Database Using Hash Tables"; the content of which is incorporated by this reference in its entirety for all purposes as if fully disclosed herein.

FIELD OF THE INVENTION

The present invention relates generally to data manipulation and management and, more specifically, to techniques for efficiently performing data aggregation operations on data stored in a database.

BACKGROUND

Aggregation and duplicate removal are common operations performed on data stored in databases. Data in a relational database management system (RDBMS) is aggregated in response to a query, such as a SQL query, that includes an aggregation function (e.g., SUM, COUNT, AVG, etc.) with a GROUP BY clause. Duplicate records are removed from data in a RDBMS in response to a SELECT DISTINCT clause. Data is either aggregated on the fly or is pre-computed in materialized views or tables for later use. Data aggregation is a critical operation in data warehousing and OLAP environments, as a large volume (e.g., terabytes) of the data needs to be aggregated and, typically, in a fixed time period. Because of its widespread and frequent use, performing data aggregation and duplicate removal operations as efficiently as possible is critical.

Aggregation and duplicate removal operations require bringing together records having the same key values. In some database systems, these operations are performed using a sort-based algorithm. Sort-based algorithms typically employ a sort based on an in-memory (i.e., in system memory) insertion tree, to find the matching records, i.e., records with the same values for key columns. These matching records are either aggregated or eliminated based on whether the operation is aggregation or duplicate removal, respectively. Each input record is looked up in the insertion tree to determine whether or not there is already a matching record in the tree. If there is already a matching record in the in-memory tree, then, when the operation being performed is aggregation, the input record is aggregated with the existing record. For duplicate removal, the input record is ignored because the input record is a duplicate of the matching record.

Performing a lookup operation in the insertion tree involves traversing the tree, and performing as many comparisons as there are levels in the tree. The complexity of such an algorithm is O(N log M), where N is the number of input records and M is the number of output records. If there is not enough system memory available to complete the entire operation, then the contents of the in-memory insertion tree get flushed to persistent storage (e.g., disk) and contribute to what is referred to as a sorted run. These sorted runs are then merged in stages to finish the sorting and aggregation process. The number of merge stages (also referred to as merge passes) required is logarithmic to the number of sorted runs, with each merge pass requiring a read and write of data to disk. Thus, the sort-based aggregation algorithm has logarithmic complexity and is computationally expensive.

Another disadvantage with sort-based algorithms is that results cannot be returned to the user until the sort is finished. Consequently, the query response time is higher than with alternative algorithms.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

The techniques described herein are generally referred to as hash-based aggregation. However, variations of such techniques may be implemented to apply to queries requiring duplicate removal (e.g., queries having a SELECT DISTINCT clause), as well as to queries requiring simple aggregation and distinct aggregation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Terminology Overview

The techniques described herein are applicable to processing data items, generally, such as data items stored and managed in a database. In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

Records, and rows, are also generally referred to herein as "data items." When referring to partitioning of data items, an "entry" that corresponds to a data item is stored in a partition slot. Typically, only the query-relevant portion of a data item is retrieved and stored as an entry in a partition slot, which may not consist of the entire data item. For example, assume table "emp" consists of columns (empno, name, mgr, deptno, salary) and a query is as follows:

select mgr, deptno, sum(salary) from emp group by mgr, deptno.

Then, the entry stored in the partition slot would consist of values for (mgr, deptno) and the running sum of salary.

When referring to building a hash table on a partition, in order to distinguish from entries in a partition slot, the hash table is populated with "hash table entries" that are based on key values for corresponding data items.

Functional Overview of Embodiments of the Invention

A hash aggregation technique described herein operates in two phases. In the first phase, referred to as the "load phase," data read from an underlying row source is partitioned on GROUP BY keys with on-the-fly aggregation. During the load phase, it is determined into which partition an entry corresponding to the incoming data item should be grouped, based on the GROUP BY key value. Also during the load phase, it is determined whether a matching entry is already present in the partition, based on the GROUP BY key value. Whether a matching entry exists is determined by probing a hash table (HTB) built for the partition. For aggregation operations, if a match is found, then a measure value from the incoming data item is aggregated with a measure value for the corresponding entry existing in the partition. Otherwise, the measure value from the incoming data item is inserted into the partition and a hash table entry is added to the HTB for the partition. For duplicate removal operations (e.g., SELECT DISTINCT), if a match is found, then the incoming data item is discarded. Otherwise, an entry is inserted into the partition and a hash table entry is added to the HTB for the partition.

The hash tables built on partitions during the load phase are in-memory structures. If there is not enough memory in the system (i.e., volatile memory) to complete the load phase, then one or more partitions are spilled to disk. When a partition spills to disk, then the HTB on the partition is discarded and aggregation stops for this partition, mainly because the partition that was spilled would need to be scanned and aggregated anyway. In other words, entries that go to a spilled partition will be inserted in the partition, without any aggregation. Thus, at the end of load phase, partitions are either (a) completely in memory with aggregated data, or are (b) partially on disk. Aggregated results for partitions that are completely aggregated during the load phase can be returned immediately.

Thus, with hash-based aggregation as described herein, only one partition at a time is spilled to disk, as necessary. By contrast, with sort-based aggregation algorithms (i.e., tree-based), the entire in-memory insertion tree is spilled to disk when necessary.

In the second phase, referred to as the "aggregation phase," one spilled partition is processed at a time, whereby aggregation of the data in that partition is completed and results are returned. During the aggregation phase, aggregation takes place by using a hash table on the partition, whereby the hash table is used to find the matching records that will be aggregated. Entries that match based on their hash key values are either aggregated in place, or the two-phase hash aggregation process is repeated recursively on the data from the partition. Several algorithms are described for processing the data that was spilled to disk, to complete aggregation of such data. A suitable algorithm is selected based on the aggregation factor (e.g., output size/input size) resulting from the load phase, as well as the size of the partition and the memory available.

Two-Phase Hash-Based Aggregation

Hash Aggregation operates in two phases. In phase one, data read from the underlying row source will be loaded into partitions based on GBY keys with on-the-fly aggregation. Partitions that are in-memory at the end of phase one are completely aggregated and records from those partitions can be returned immediately. In the second phase, partitions that were spilled to persistent storage (e.g., disk) during phase one are processed further to complete the aggregation process. One partition at a time is processed, whereby aggregation of the data in that partition is completed and the results are returned. During both phases, aggregation (or duplicate removal in the case of SELECT DISTINCT) takes place by using a hash table on the partition. Hash tables are used to find the matching records that will be aggregated (or discarded in the case of duplicate removal). The two-phase hash approach is described herein primarily in the context of an aggregation operation, with differences noted for a duplicate removal operation.

Figure 1:
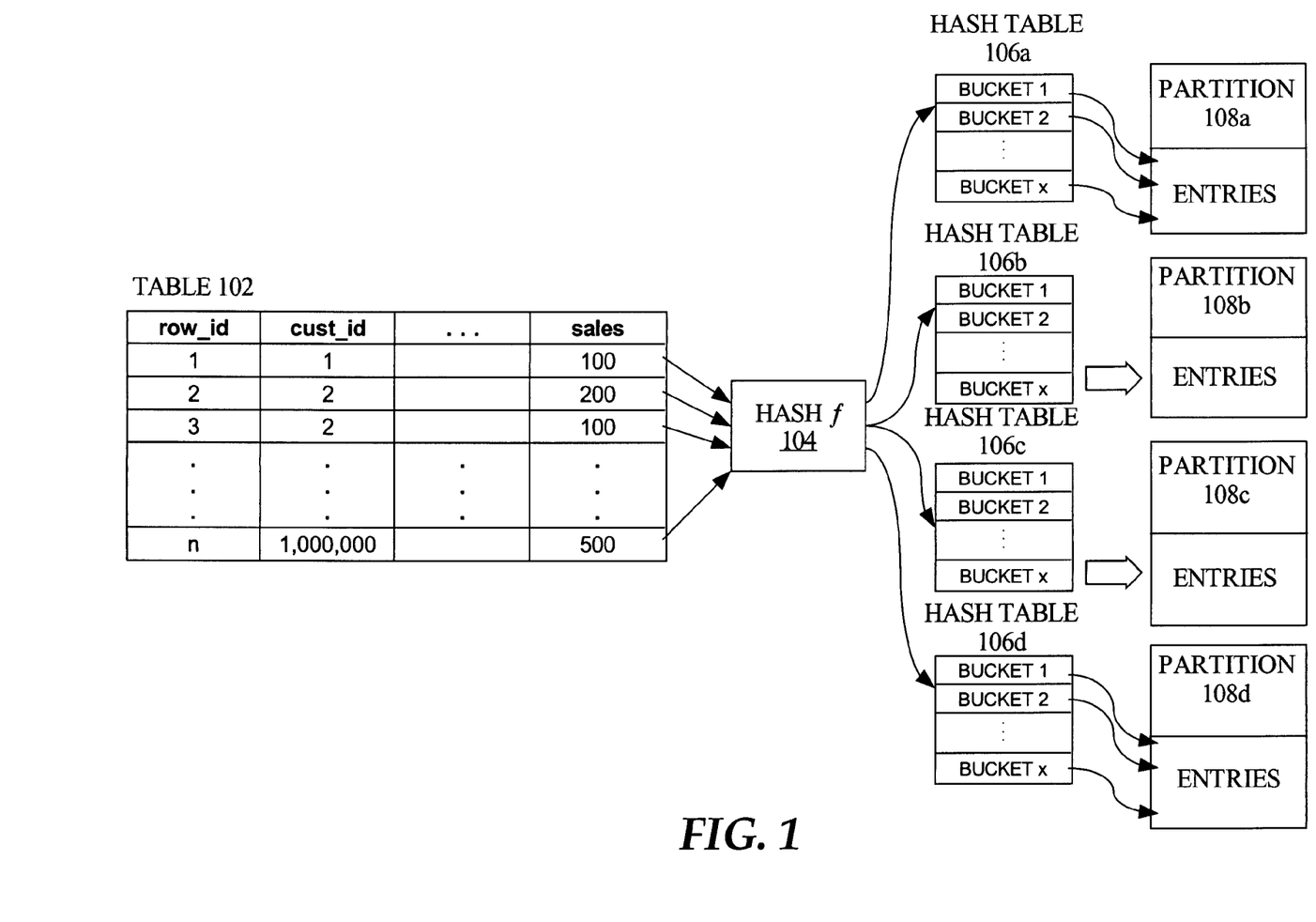
FIG. 1 is a diagram that illustrates techniques for performing a data aggregation operation that aggregates values based on a grouping key, according to an embodiment of the invention.

FIG. 1 is a diagram that illustrates techniques for performing a data aggregation operation that aggregates values based on a grouping key, according to an embodiment of the invention. The techniques may be performed by executing one or more sequences of instructions by one or more processors, such as within a computer system (e.g., computer system 400 of FIG. 4).

Phase One: Load Phase

FIG. 1 depicts a database table 102 containing a number of rows. Included in the example table 102 are columns for a row identifier (row_id), customer identifier (cust_id), and sales (sales), which is referred to as a measure. Each row in table 102 has a measure value in the sales measure column, where the sales column may contain a null.

Partitioning by Grouping Key(S)

Because system volatile memory is typically limited, and database tables may contains hundreds of thousands of rows, the amount of memory required to completely process an aggregation or duplicate removal operation on such a large table will often exceed the available memory. Hence, as mentioned, at some point(s) during processing, data is spilled to persistent memory (e.g., disk). To facilitate controlled and intelligent spillage to disk, the data items being processed are partitioned into a number of partitions, or groups. Hence, each of the data items of table 102 is partitioned to one of partitions 108a-108d, where the depiction of four partitions is simply a non-limiting example. When it comes time to spill data to disk, data is spilled by partition. That is, one or more full slots of volatile memory, at that point in time, are spilled to disk. Note that all the slots of the partition, excluding the last slot, are full and are written to disk when spilled.

Fanout

The hash table infrastructure used to implement the two-phase approach is initialized with information about, for non-limiting examples, group-by keys and their cardinalities (e.g., the number of distinct values likely, for a given group-by key), work area size (i.e., the amount of memory for storing processing information), input row estimates and the necessary callback functions. The infrastructure is capable of determining the number of partitions (referred to as "fanout") into which the input data is divided. The general goal in determining fanout is to use partitions that are small enough to fit into volatile main system memory, with memory consumption within the limit imposed by a system memory manager.

Note that choosing a large fanout will lead to smaller partitions. However, this would lead to more memory consumption during phase one. In one embodiment, the memory requirement in phase one is (fanout*1.5*slot size+size of hash tables built on partitions). In phase one, the desired number of slots is approximately 1.5 times the fanout so that there are at least some free slots for when needed. In one embodiment, the memory requirement in phase two is (partition size+size of hash table built on the partition). Assuming uniform distribution, the partition size would be (input estimate/fanout). In any case, memory consumption should be within the limits imposed by the system memory manager.

Embodiments of the invention are not limited to using any particular technique for determining, or estimating, the fanout used with the hash aggregation techniques. Thus, the approach used to determine the fanout may vary from implementation to implementation. For example, another such non-limiting approach to estimating the fanout is based on the number of groups (i.e., the number of output records) rather than the number of input records.

Volatile Memory Slot Size

The amount of memory to be used during the load phase is obtainable from a system memory manager. However, not all of this memory can be used to store entries corresponding to data items. Some of this memory is used for structure overheads, partition metadata, and hash tables, for example. Thus, the amount of memory actually available for storing the entries is represented, generally, by the following formula.

memory_actual=memory_given−structure overheads
  (e.g., [fanout*(size of partition metadata),
  (fanout*(size of hash table on a partition), etc.]);

where memory_given represents the amount of memory provided by the system memory manager.

Units of the volatile memory in which entries are sequentially stored, are referred to as "slots" (also referred to as "pages"). Each slot comprises a number of contiguous blocks of memory, and is sized to be relatively large (e.g., 1 Megabyte). In other words, the volatile memory slots are sized so that a lot of data can be written to persistent storage with each single IO write operation to the persistent storage. Because entries within a given partition are written to a slot sequentially rather than randomly, the slots effectively function as IO buffers. That is, entries within a given partition are co-located in volatile memory so that the entries can be efficiently stored persistently, if needed. This provides for efficient freeing of volatile memory in contiguous blocks.

The slot size is generally determined based on the IO characteristics of the system, with a general goal of minimizing random seek operations. More specifically, slot size is calculated based on an input size (number of data items) estimate, an input data item size estimate, and memory given by the system memory manager. Basically, fanout and slot size are determined together, with a goal of choosing as big a slot as possible so that IO operations are efficient. For example, if the memory manager allocates an amount of memory M, and if a 1 MB slot size is chosen (i.e., slot size S=1024*1024), then the number of slots N would be equal to M/S and fanout F would be N/1.5. Thus, each partition would be of size PS=I(input size)/F. If PS is less than M, then determination of the partition size is completed. Otherwise, S is decreased and the foregoing process is repeated. The foregoing calculations are simplified in that the hash table sizes and metadata overheads are not taken into account, which are taken into account in determining F and S.

Hashing Data Items for Partitioning and Indexing

In an embodiment, a hash function, such as hash function 104 of FIG. 1, is used for partitioning data items that are the subject of an aggregation or duplicate removal operation. For each data item of table 102, the grouping key value is input to hash function 104. For example, if the query that specifies the aggregation or duplicate removal operation specifies grouping by customer ID (e.g., GROUPBY cust_id), then the value in the customer ID field is input to the hash function 104, which generates a hash value. The hash function is constructed so that the hash values are determinative of to which partition 108a-108d each data item will be partitioned, or associated with.

Hash tables 106a-106d, one per partition in one embodiment, are used to facilitate aggregation and duplicate removal and to index the volatile memory slots associated with a corresponding partition 108a-108d. Hash tables 106a-106d are used to store, in hash buckets, locating information (e.g., pointers) to locations in memory associated with the corresponding partitions 108a-108d. Based on the hash function 104, each data item from table 102 gets hashed and stored in a hash bucket. All data items with the same grouping key values (e.g., cust_id) get hashed to and stored in the same hash bucket.

In an embodiment, the initial size of a hash table 106a-106d (e.g., the number of buckets) built for a given partition 108a-108d, is based on the number of data items with unique values for the grouping key(s), i.e., the number of data items output from the aggregation operation, that are associated with the partition. The number of data items output from the aggregation operation can be estimated by the query optimizer based on, for example, the cardinality of the grouping key(s). For example, the initial size of the hash table may be estimated as (the number of data items output from the aggregation
  operation/fanout)*2;

where the factor of 2 is used to minimize the chances of collisions (i.e., a phenomenon in which two data items with different grouping key values hash to the same hash bucket). Thus, if table 102 contained 100,000 unique customer IDs and the fanout is 100 partitions, then 2000 buckets would be used for each of the 100 hash tables corresponding to the 100 partitions and the probability of multiple key values hashing to the same bucket would be very small.

Aggregation Operation

If an aggregation operation is being performed, each entry in a partition stores a running tally of the measure being aggregated. For example, if a query specifying sum of sales with group by customer ID is issued against table 102, then during processing of the query, an entry that includes a running summation of the sales values is stored in volatile memory in association with the corresponding partition

108a-108d, for each unique value of cust_id. When the first data item with a particular grouping key value is read from table 102 and processed, (1) the grouping key value is hashed, using hash function 104, to a corresponding hash table 106a-16d bucket based on the hash value, (2) an entry that includes the sales value for that first row is stored in volatile memory, and (3) a pointer is generated, in association with the hash bucket, that identifies the location in memory at which the entry is stored.

When any other data items with that particular grouping key value are read from table 102 and processed, (1) the grouping key value is hashed using hash function 104, which produces the same hash value as other data items having that same grouping key value, and (2) the corresponding hash table 106a-106d is probed to determine whether there already exists a hash table entry that corresponds to the hash value. Because such a hash table entry already exists for the particular hash value, then the sales value for the row being processed is summed (or otherwise aggregated according to the aggregation operation specified in the query) with the sales value in the corresponding entry stored in volatile memory, and the corresponding entry is updated with the newly aggregated value. The pointer remains unchanged.

Duplicate Removal Operation

If a duplicate removal operation is being performed, such as SELECT DISTINCT, when the first data item with a particular grouping key value is read from table 102 and processed, (1) the grouping key value is hashed, using hash function 104, to a corresponding hash table 106a-16d bucket based on the hash value, (2) an entry (which may include a measure value if the query specifies a distinct aggregation operation) corresponding to that first data item is stored in volatile memory, and (3) a pointer is generated, in association with the hash bucket, that identifies the location in memory at which the entry is stored.

When any other data items with that particular grouping key value are read from table 102 and processed, (1) the grouping key value is hashed using hash function 104, which produces the same hash value as other data items having that same grouping key value, and (2) the corresponding hash table 106a-106d is probed to determine whether there already exists a hash table entry that corresponds to the hash value. Because such a hash table entry already exists for the particular hash value, the data item is discarded.

Row Layout

In an embodiment, entries are stored in volatile memory slots corresponding to partitions 108a-108d in the following format: row length::key length::hash value::group-by key(s):: work area. Row length field stores the total size of the entry and is useful for navigating through the data slots and also for copying hash entries during repartitioning. Key length field stores the total length of group-by key column(s) and is useful for comparing group-by keys for two hash entries at once. The hash value computed on group-by key(s) is stored in the hash value field and is used during phase two when building a hash table on a partition spilled to disk. The value stored is the hash value used to probe the entries in the hash table to find a matching data item. Individual aggregate values are stored in the work area field.

Handling Bad Estimates

As discussed, the hash aggregation techniques described herein use input estimates to determine various parameters that affect performance. These parameters include the following.

Fanout: if the fanout is too small, then the result may be partitions that are too big and that, consequently, need to be repartitioned during phase 2; if the fanout is too large, then more volatile memory is consumed and memory is wasted.

Slot (volatile memory) size: should be computed to leverage the IO bandwidth.

Hash table size: the number of buckets should be large enough to reduce collisions. If hash tables are too large, then memory is wasted, and if hash tables are too small, then more collisions occur and lookup operations become more expensive. For better performance, each hash table 106a-106d should have no more than one entry per bucket.

Because bad estimates degrade the performance of hash aggregation, attempts at minimizing performance degradation include the following. If the hash tables are undersized due to low input estimates, then the size of a hash table is dynamically increased as entries are inserted into the table. In one embodiment, the table growth is triggered when the number of empty buckets falls below a certain threshold, e.g., when the hash table is 70% full. In one embodiment, the size of the hash table is doubled at each growth step. This dynamic table growth technique is applicable to both phases of the hash aggregation techniques. In addition, statistics are maintained and used throughout the hash aggregation process. These statistics include the number of input data items, number of groups (i.e., unique values for the grouping key), and the average data item (e.g., row) length. One example of a use for such statistics collected on a partition 108a-108d during load phase (phase one) is to estimate the result size and, therefore, the hash table size for the aggregation phase (phase two).

Loading Rows

The foregoing process is performed for every data item of table 102. Because of the limited volatile memory slot size, once one memory slot is filled for a given partition, a new memory slot is used to store subsequent entries for that partition. This occurs until there is no longer enough volatile memory remaining to process another data item from table 102. The volatile memory from which new slots are "created" for, and linked to, a given partition, is the volatile memory allocated for that partition.

As discussed, all in-memory partitions 108a-108d will have corresponding hash tables 106a-106d built on them. If slots of a partition are spilled to disk, then the hash table associated with that partition can be discarded and associated resources freed. The hash table is discarded at this point because, for example, a hash table will be built on this partition anyway for aggregating data items in this partition during phase two, and continuing the on-the-fly aggregation on the partition contradicts the reason for the partition being spilled to disk (e.g., reduction in data) and, hence, will not be beneficial. Subsequently, on-the-fly aggregation stops for that partition and entries will be inserted into memory slots as data items are read from table 102 and processed.

Figure 2:
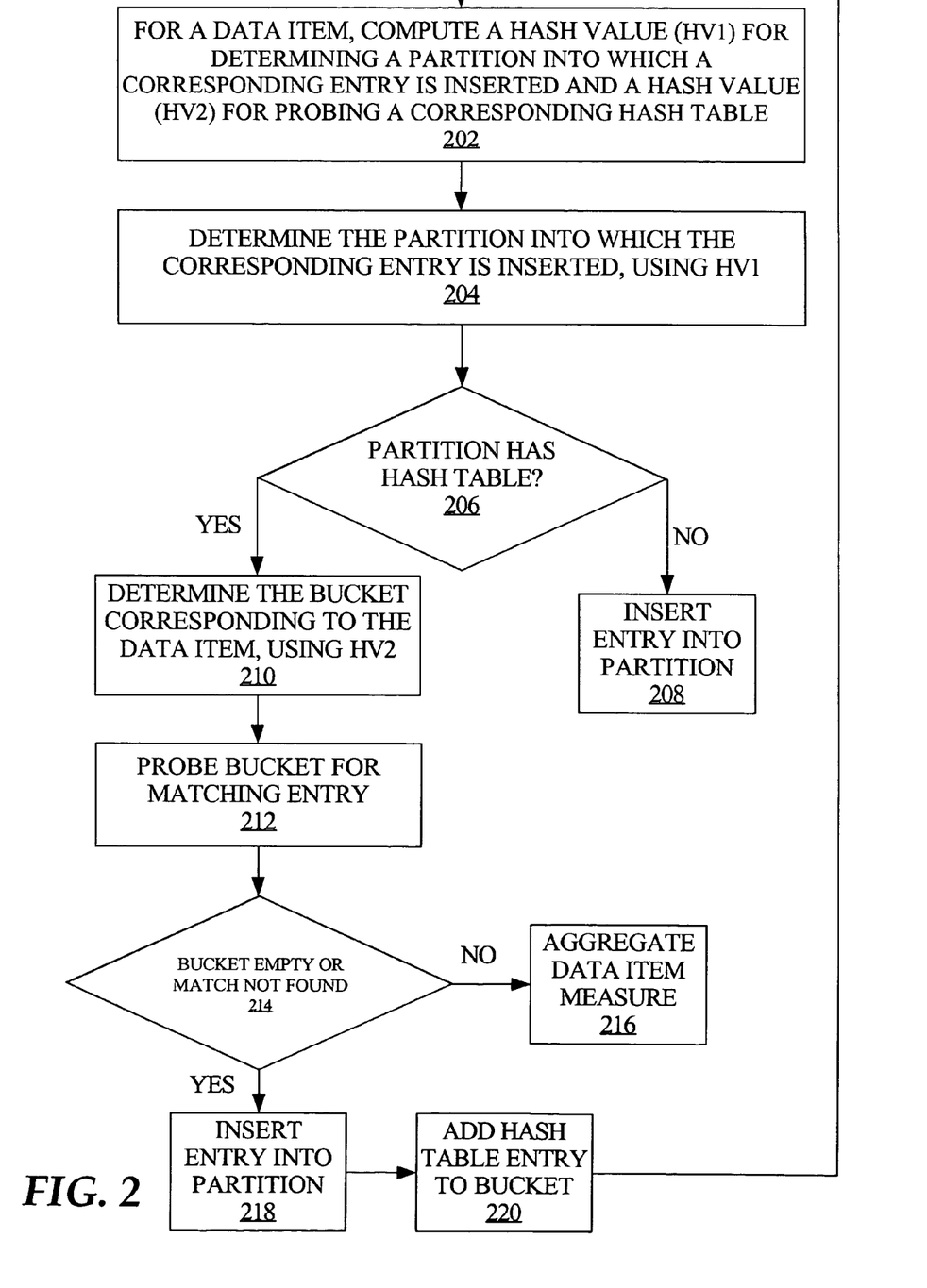
FIG. 2 is a flow diagram that illustrates a method for performing a data aggregation operation, according to an embodiment of the invention.

FIG. 2 is a flow diagram that illustrates a method for performing a data aggregation operation, according to an embodiment of the invention. The method of FIG. 2 may be performed by executing instructions by a computing system, such as computer system 400 of FIG. 4. For example, the method may be performed by a database server.

At block 202, for a data item (e.g., a row of a database table), two hash values are computed: (1) one for determining a partition into which an entry corresponding to the data item is grouped, referred to as HV1; and (2) one for probing a corresponding hash table, referred to as HV2. For example, the value for the data item grouping key(s), such as cust_id of table 102, is input into one or more hash functions, such as hash function 104 (FIG. 1), to produce respective hash values that indicate the partition 108a-108d (FIG. 1) to which the corresponding entry is stored and the bucket into which the corresponding hash table entry is stored.

At block 204, the partition into which the corresponding entry is inserted is determined based on HV1, using conventional hashing techniques. At decision block 206, it is determined whether or not a hash table corresponding to that partition already exists. For example, HV1 may indicate that the entry belongs to partition 108b, and that there currently is no hash table 106b that corresponds to partition 108b. If there is no corresponding hash table, then that is the first entry for partition 108b or partition 108b has already been spilled to disk and, consequently, the hash table 106b was already destroyed. If there is no corresponding hash table, then an entry for the data item is simply inserted into a volatile memory slot corresponding to the partition, at block 208.

If there is a corresponding hash table, then the proper hash bucket that corresponds to HV2 is determined, at block 210, using conventional hashing techniques. At block 212, this corresponding bucket is probed to find a matching entry. For example, the HV2 and the grouping key value for the data item are compared to the HV2(s) and grouping key values of existing hash table entry(s) associated with the corresponding bucket, in the corresponding hash table 106b.

At block 214, it is determined whether or not the corresponding bucket is empty and, if the bucket is not empty, then whether or not a match is found based on HV2. If the bucket is not empty and a matching hash table entry is found, then the data item is aggregated at block 216. That is, the measure value for the data item, e.g., the value in the sales column of table 102 (FIG. 1), is aggregated with the running measure value for the previously-processed data items in the corresponding partition 108b, having the same grouping key value.

For example, processing the row of table 102 that has the row_id=3 would find that this row hashes to the same partition (which has an existing hash table) and bucket as the row that has row_id=2, because both rows have a cust_id=2. A bucket already exists and is not empty because there is a hash table entry for the row_id=2 row, and the hash table entry for the row_id=2 row is found to match with hash table entry for the row_id=3 row. The entry that is stored in a volatile memory slot corresponding to the partition to which the two data items are hashed would have a measure value of 200, corresponding to the value in the sales column for the row_id=2. Block 216 would add (assuming a sum aggregation) the value in the sales column for the row_id=3 to the value in the sales column for the row_id=2. Hence, 100+200=300, which is stored in the same memory slot for the corresponding grouping key value.

If the aggregation operation was not a sum operation, then the appropriate aggregation operation is performed instead of sum, according to the operation specified in the query. Similarly, if the operation was not an aggregation operation, but was a duplicate removal operation, then rather than aggregate the measure value for the row_id=2 row with the corresponding entry in the memory slot, the row_id=2 row would be discarded without further processing, i.e., this row would be removed because it is a duplicate and is not distinct.

If, at block 214, the corresponding bucket is empty or a matching hash table entry is not found in the corresponding bucket, then an entry is inserted into the corresponding partition for the data item, at block 218. For example, an entry may be stored in a volatile memory slot corresponding to the partition, in the format described herein. Furthermore, at block 220, a hash table entry is added into the appropriate hash bucket corresponding to the hash value, to index the corresponding entry stored in volatile memory at block 218. Control can then pass back to block 202 to read and process the next data item, such as the next row of table 102 (FIG. 1).

Controlling Spillage of Data to Persistent Storage

While processing the input data items, if a data item is read, for which there is not enough volatile memory available to store the corresponding entry in the partition, then a partition is selected to spill to persistent storage (e.g., disk). In one embodiment, the largest partition, i.e., the partition having the most volatile memory slots, is selected for spillage to persistent storage. Hence, the maximum amount of volatile memory is freed by spilling the largest partition to disk.

Spilling a partition to persistent storage means scheduling IO operations, one per slot, to store in persistent memory all the entries stored in each slot associated with the partition. Furthermore, because entries within a slot are clustered in contiguous blocks of memory, such an IO operation is efficient. The slots effectively function as prepackaged IO buffers as entries are written into the slots. Writing data from volatile memory slots to persistent storage may be performed asynchronously by scheduling an IO operation for each slot sequentially, and immediately returning to processing of input data items.

Once a partition is spilled to persistent storage, then data items for that partition that are processed later (i.e., after that partition is spilled) are no longer aggregated on-the-fly, but are simply hashed and stored in volatile memory slots corresponding to the partition. The data items are hashed in that they are still input to the hash function to determine to which partition and hash bucket they belong. Thus, entries corresponding to these data items can be stored in slots corresponding to the appropriate partition, and the hash value is stored in the entry and will be used for building the hash table built during phase two. As soon as a slot is filled, an IO operation is immediately scheduled to write the slot to persistent storage, and a new slot is allocated for that partition.

Using the described techniques, aggregation is performed on-the-fly and only part of the data being processed (i.e., entries in the partition chosen for spilling) is written out to persistent storage during a given spillage operation. This is in contrast with prior sort-based aggregation schemes, in which the entire processed data is written to persistent storage whenever available volatile memory runs out.

Selecting the "victim" partition, i.e., the partition that gets spilled to disk, is generally based on the following. A partition that has already been spilled to disk may be selected so as not to increase the number of partitions to be processed in phase two, and to be able to keep aggregating the partitions that are in memory. The largest partition may be selected so that asynchronous I/O on the slots of the partition can be issued and, therefore, more slots are freed at once. If no partition has been spilled to disk yet, then the largest in-memory partition is chosen so that more slots can be freed at once. Intuitively, more records are going to get inserted into the largest partition because of skew in data, and this partition will eventually have to spill it to disk due to lack of memory. Hence, by spilling the largest partition, many smaller partitions are left in memory, where aggregation on the smaller partitions can likely be completed in memory.

One other advantage provided by the described techniques is that once all the data items have been read and at least partially processed, the partitions that were not spilled to persistent storage are completely aggregated (or duplicates removed) and results can be returned immediately based on each of these partitions, and their memory reused for phase two. That is, each of the memory slots for non-spilled partitions can be scanned and the corresponding aggregated measure values returned. Hence, results can be returned quicker with hash based aggregation than with traditional sort-based aggregation. Producing partial results fast is highly beneficial because these results can flow down the query execution pipeline (e.g., up the row source tree) for further processing, rather than having to wait for completion of the entire aggregation operation.

If, after phase one, all partitions fit in volatile memory, then there is no need to continue to phase two. Each of the memory slots can be scanned for each partition and the corresponding aggregated measure values returned. However, if any of the partitions were spilled to disk during phase one, then phase two is invoked.

Figure 3:
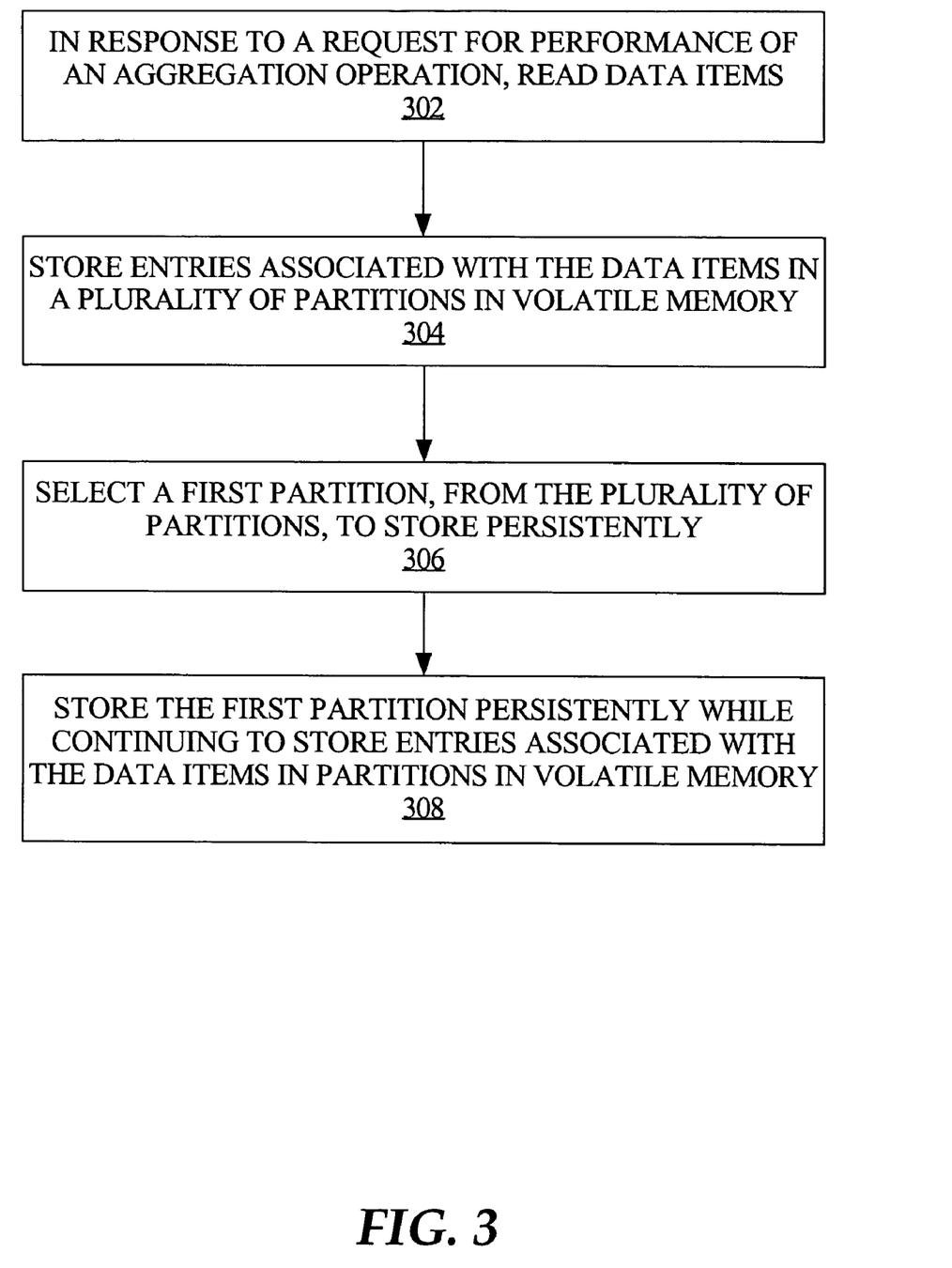
FIG. 3 is a flow diagram that illustrates a method for performing a data aggregation operation that aggregates values based on a grouping key, according to an embodiment of the invention.

FIG. 3 is a flow diagram that illustrates a method for performing a data aggregation operation that aggregates values based on a grouping key, according to an embodiment of the invention. The method of FIG. 3 may be performed by executing instructions on a computing system, such as computer system 400 of FIG. 4. For example, the method may be performed by a database server.

At block 302, data items are read from memory in response to a request for performance of an aggregation operation. For example, rows are read from table 102 (FIG. 1). At block 304, entries associated with the data items are stored in partitions in volatile memory. For example, entries are stored in volatile memory slots corresponding to partitions 108a-108d (FIG. 1), based on grouping key values. In one embodiment, the entries are stored in a format that includes at least the hash value, the GBY key, and the non-aggregated or aggregated measure value.

Blocks 306 and 308 are performed during the processing of data items, i.e., storing corresponding entries in associated partitions, and in response to running out of available volatile memory for use in storing more entries. At block 306, a particular partition is selected for storing persistently, e.g., spilling to disk. At block 308, the particular partition is stored persistently while continuing to store other entries in partitions in volatile memory.

Phase Two: Aggregation Phase

During phase two, referred to as the aggregation phase, each partition that was spilled to persistent storage is processed, i.e., aggregation on these partitions is completed. Hereafter, when referring to partitions in the context of phase two, what is meant is the partitions that were stored persistently in phase one. For a given partition, whether the data from the partition is (1) aggregated completely in volatile memory or (2) the two-phase aggregation process is repeated on the data from the partition, depends on the size of the partition, the amount of volatile memory available, and the aggregation factor (e.g., output size/input size, which is known from building of phase one hash table on the partition). The method selected can be dynamically adjusted from partition to partition, based on these factors.

As described, aggregation stops on a partition once the partition is spilled to disk. At this point, in one embodiment, a snapshot is taken of the number of rows. This is to precisely estimate the number of groups when sizing the hash table to be built on this partition during phase two. Total number of groups M in the partition is estimated using a database optimizer function that scales the distinct values. Knowing the number of distinct values (or the number of groups) M1 and the number of entries loaded N1 in the partition at the first spill of the partition and the total number of entries N in the partition, this function can be used to obtain the number of distinct values (or groups) in the partition. The value M1 is also used in optimizing the construction of the hash table on the spilled partition. For M1 entries, there is no need to probe the hash table because they are known to be unique entries.

In one embodiment, the size of the aggregated result for a partition is estimated using partition statistics, as follows.

Aggregated result size=number of groups (ndv)*average row length where
ndv=number of distinct values obtained by calling optimizer function, as a function of sdv, smps, and cdn;
sdv=number of groups processed when partition first spilled to disk;
smps=number of data items processed when partition first spilled to disk; and
cdn=number of entries in the partition.

Methods for Returning Results of Spilled Data

Generally, when there is much reduction of data (i.e., low aggregation factor) and the reduced data can fit in available volatile memory, a hash table is built on the partition for aggregating matching records. In one embodiment, the hash values for this data from phase one are stored and, therefore, do not need to be recomputed. As mentioned before, aggregation takes place during the build of the hash table. When a hash table entry is inserted into the hash table, the hash table is probed for a matching hash table entry and if one is found, the incoming data item is aggregated with the matching partition entry. Aggregated entries are kept separately in a set of slots different than the slots holding the non-aggregated entries of the partition. To return results, the slots with aggregated entries are scanned. This method is referred to as "copy scan" because aggregated entries are copied to different slots. The amount of memory required for the copy scan method can be computed as follows:

(number of slots required for storing the groups)*slot size+size of hash table+(number of slots for scanning the partition)*slot size;

where
the number of slots required for scanning the partition is maximum entry size/slot size+1 (for reading ahead asynchronously the next slot in the partition).

A variation of the "copy scan" method is the "filter scan" method, in which the aggregated entries are marked or flagged instead of copying them to different memory location (i.e., slots). This is applicable if there is not much reduction in data from aggregation and, therefore, "copy scan" would require a lot of copying. Results are obtained by scanning the partition and returning only marked records. This algorithm is generally used when there is not much reduction in the data (e.g., aggregation factor>=0.8) and there is enough volatile memory available to keep the entire partition in memory. Both copy scan and filter scan use sequential memory access while returning the result rows. The amount of memory required for the filter scan method can be computed as follows:

(number of slots in the partition)*slot size+size of hash table.

An alternative method, referred to as the "hash table scan" method, is similar to the filter scan except that the hash table is scanned to return results rather than scanning the partition. This method uses random memory access, and is effective when the result is very small (very low aggregation factor) and enough volatile memory is available to keep the partition in memory. The amount of memory required for the hash table scan method is the same as that for the filter scan method.

Another method is referred to as the "repartitioning" method. This method is employed when there is not enough system volatile memory to hold the aggregated data for a partition. Ideally, the aggregated data for a partition fits in memory during phase 2. However, in some cases, we might not even have memory to process the partition using the "copy scan" algorithm. This can happen, for example, if the system manager did not provide enough memory because there is a high load on the database system, or when the input estimates are so low that a smaller fanout was chosen and, consequently, partitions are huge. In these cases, the repartitioning method is used. With this method, the data from the partition is scanned and the two-phase aggregation process is repeated. In other words, the given partition is repartitioned into sub-partitions while doing load-phase aggregation, and then the sub-partitions are aggregated one at a time. This process is repeated if sub-partitions cannot fit in memory.

In one embodiment of the repartitioning scheme, different hash values are used at different repartitioning steps. The recursive depth is used as the seed value in the hash value computation, where the hash values are computed on group-by keys. By doing so, the hash function is guaranteed to generate different hash values at different recursive levels.

Handling Distinct Aggregate Operations

Distinct aggregate (DAG) processing requires elimination of duplicates in each of the aggregate's measure values, and then aggregating the unique values. Duplicates need to be eliminated in the measure column of the distinct aggregate operators. A separate record is created for each distinct aggregate (a DAG record) and one record is created for all non-distinct aggregates (an NDAG record). As with the two-phase procesing of non-distinct aggregates, the data is partitioned on GBY keys and one partition is processed at a time. However, processing involves duplication elimination for DAGs, and aggregation for any NDAGs. Thus, during the load phase, aggregation is performed for NDAG entries and duplicate removal is performed for DAG entries for all in-memory partitions. Similarly, while processing one partition at a time during phase two, aggregation is performed for NDAG entries and duplicate removal is performed for DAG entries.

At this point in the process, (1) all duplicates have been eliminated and DAG entries are ready to be aggregated, and (2) aggregation is finished for all NDAGs. Now, DAG entries are read and aggregated, and output records (one record for each group) are constructed. To construct an output record, NDAG and DAG entries for a given group (i.e., GBY key values) need to be brought together. Another hash table is created to accomplish this step, in which hashing and probing is performed on GBY keys to complete aggregation for the given group.

Hardware Overview

Figure 4:
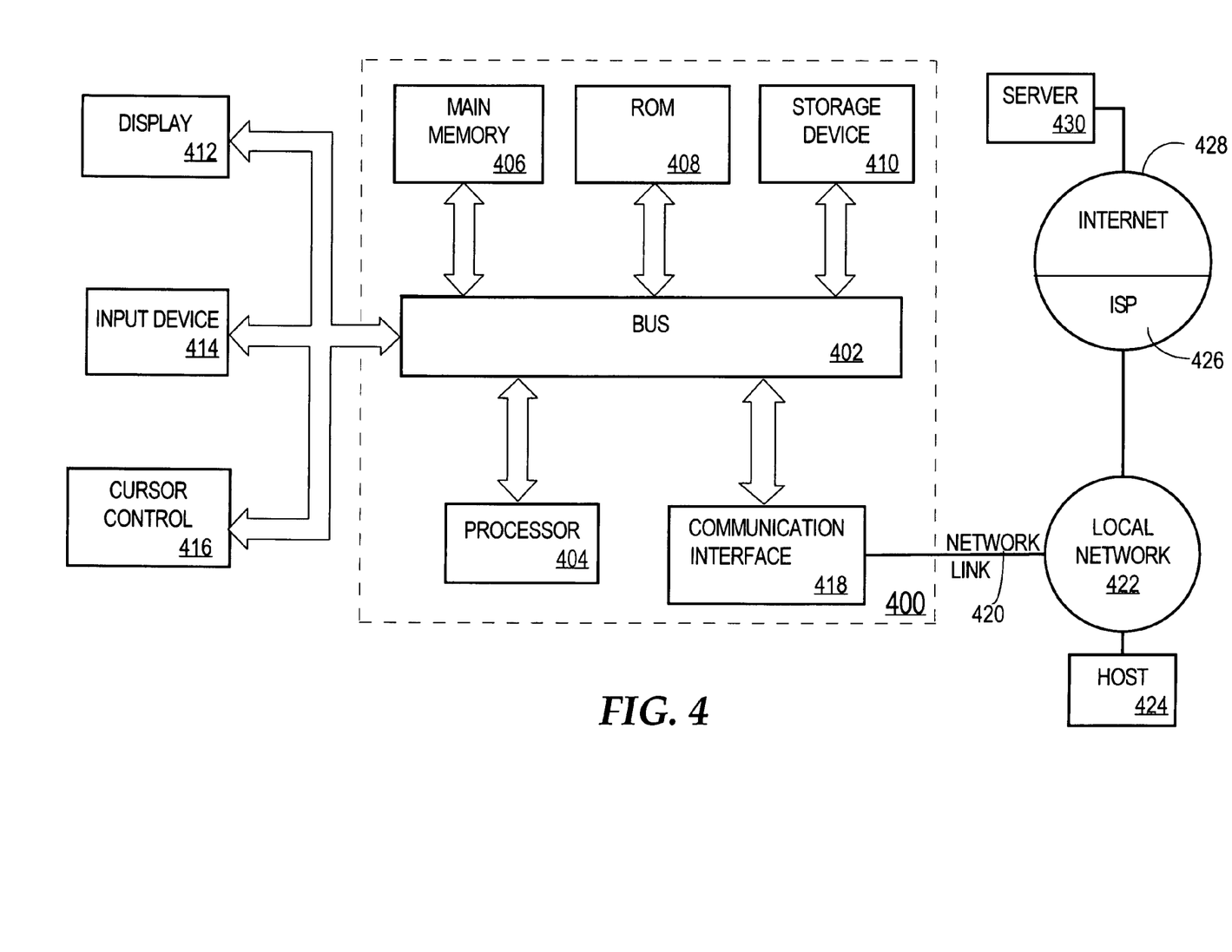
FIG. 4 is a block diagram that illustrates a computer system 400 upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for performing a data aggregation operation that aggregates values based on a grouping key, the method comprising:
   in response to a request for performance of said data aggregation operation, reading data items on which said data aggregation operation operates;
   for each data item of said data items on which said data aggregation operation operates, determining which partition, of a plurality of partitions in volatile memory, corresponds to the data item;
   wherein determining which partition corresponds to each data item includes applying a hash function to a key value, of the data item, that corresponds to the grouping key specified in the request;
   based on the partitions to which the data items correspond, storing entries associated with said data items in said plurality of partitions in said volatile memory;
   wherein each partition from said plurality of partitions contains entries associated with data items having a key value, for said grouping key specified in said request, that corresponds to said partition;
   for a first corresponding partition of said plurality of partitions,
      generating a first hash table to index said first corresponding partition based on said grouping key;
      for a first data item that corresponds to said first corresponding partition based on said grouping key, said first data item being associated with a first grouping key value for said grouping key: inserting a first entry in said first corresponding partition for said first grouping key value, said first entry including a first measure value for aggregation for said first grouping key value;
      for a second data item that corresponds to said first corresponding partition based on said grouping key, said second data item having a second measure value and being associated with said first grouping key value for said grouping key:
         probing said first hash table;
         based on probing said first hash table, determining that said first corresponding partition already includes an entry for said first grouping key value;
         in response to determining that said first corresponding partition already includes said entry for said first grouping key value, generating another measure value and storing said another measure value in said first entry.

2. The method of claim 1, further comprising:
   while storing said entries in said plurality of partitions, and in response to filling said volatile memory up to a particular threshold level,
      selecting a first partition, from said plurality of partitions, to store persistently, and
      storing said first partition persistently, while continuing to store entries associated with said data items in partitions from said plurality of partitions in volatile memory;
   in response to storing said first partition, freeing resources used by a hash table for said first partition.

3. The method of claim 1, further comprising:
   while storing said entries in said plurality of partitions,
   constructing hash tables for indexing said entries in said plurality of partitions, by generating and storing hash values based on said key values for said data items;
   determining a number of buckets for each of said hash tables;
   wherein each of the hash tables corresponds to a partition;
   wherein the number of buckets for the hash table that corresponds to each partition is based on a ratio of the number of distinct values for said key value that corresponds to said partition and the number of partitions of said plurality of partitions.

4. The method of claim 3, further comprising:
in response to fullness of buckets for a particular hash table exceeding a specified threshold, dynamically expanding said number of buckets for said particular hash table.

5. The method of claim 1, further comprising:
while storing said entries in said plurality of partitions, and in response to filling said volatile memory up to a particular threshold level,
selecting a first partition, from said plurality of partitions, to store persistently, and
storing said first partition persistently, while continuing to store entries associated with said data items in partitions from said plurality of partitions in volatile memory;
in response to completing said reading of all of said data items, immediately returning entries from a second partition, of said plurality of partitions, that was not stored persistently, wherein said entries from said second partition contain aggregated measure values for data items associated with said second partition.

6. The method of claim 1, further comprising:
while storing said entries in said plurality of partitions, and in response to filling said volatile memory up to a particular threshold level,
selecting a first partition, from said plurality of partitions, to store persistently, and
storing said first partition persistently, while continuing to store entries associated with said data items in partitions from said plurality of partitions in volatile memory;
after completing said reading and storing for all of said data items, if there is not enough volatile memory to store entries associated with said first partition, then
reading said entries associated with said first partition and storing said entries in a plurality of sub-partitions in volatile memory;
while storing said entries in said plurality of sub-partitions,
constructing hash tables, for indexing said entries in said plurality of sub-partitions, with hash values based on said key values for said data items, and
aggregating measure values, according to said data aggregation operation, from data items associated with each sub-partition,
selecting a first sub-partition, from said plurality of sub-partitions, to store persistently, and
storing said first sub-partition persistently, while continuing to store entries associated with said first partition in said plurality of sub-partitions in volatile memory.

7. The method of claim 1, further comprising:
while storing said entries in said plurality of partitions, and in response to filling said volatile memory up to a particular threshold level,
selecting a first partition, from said plurality of partitions, to store persistently, and
storing said first partition persistently, while continuing to store entries associated with said data items in partitions from said plurality of partitions in volatile memory;
wherein said selecting includes selecting the largest partition of said plurality of partitions.

8. The method of claim 1, further comprising:
while storing said entries in said plurality of partitions, and in response to filling said volatile memory up to a particular threshold level,
selecting a first partition, from said plurality of partitions, to store persistently, and
storing said first partition persistently, while continuing to store entries associated with said data items in partitions from said plurality of partitions in volatile memory;
while storing said entries in said plurality of partitions in volatile memory, and after storing said first partition persistently,
storing, in a volatile memory slot, entries for said first partition; and
in response to filling said volatile memory slot to capacity, storing persistently said entries from said volatile memory slot.

9. The method of claim 8, further comprising:
reading, from persistent memory, entries associated with said first partition;
aggregating in volatile memory measure values for a measure specified in said request, from said entries associated with said first partition; and
selecting a particular process, from a group of available processes, for returning aggregated measure values;
wherein the particular process is selected based on a ratio of the number of data items associated with said first partition and the number of aggregated measure values resulting from aggregating measure values for data items associated with said first partition.

10. The method of claim 1,
while storing said entries in said plurality of partitions, and in response to filling said volatile memory up to a particular threshold level,
selecting a first partition, from said plurality of partitions, to store persistently, and
storing said first partition persistently, while continuing to store entries associated with said data items in partitions from said plurality of partitions in volatile memory;
wherein said storing of said entries into said plurality of partitions includes writing said entries in said first partition to a plurality of memory slots, wherein each memory slot comprises contiguous portions of said volatile memory; and
wherein said storing said first partition persistently includes storing each memory slot with a single respective IO operation.

11. A machine-readable storage medium storing one or more sequences of instructions which, when executed by one or more processors, causes the one or more processors to perform the method recited in claim 1.

12. A machine-readable storage medium storing one or more sequences of instructions which, when executed by one or more processors, causes the one or more processors to perform the method recited in claim 2.

13. A machine-readable storage medium storing one or more sequences of instructions which, when executed by one or more processors, causes the one or more processors to perform the method recited in claim 3.

14. A machine-readable storage medium storing one or more sequences of instructions which, when executed by one or more processors, causes the one or more processors to perform the method recited in claim 4.

15. A machine-readable storage medium storing one or more sequences of instructions which, when executed by one or more processors, causes the one or more processors to perform the method recited in claim 5.

16. A machine-readable storage medium storing one or more sequences of instructions which, when executed by one or more processors, causes the one or more processors to perform the method recited in claim 6.

17. A machine-readable storage medium storing one or more sequences of instructions which, when executed by one or more processors, causes the one or more processors to perform the method recited in claim 7.

18. A machine-readable storage medium storing one or more sequences of instructions which, when executed by one or more processors, causes the one or more processors to perform the method recited in claim 8.

19. A machine-readable storage medium storing one or more sequences of instructions which, when executed by one or more processors, causes the one or more processors to perform the method recited in claim 9.

20. A machine-readable storage medium storing one or more sequences of instructions which, when executed by one or more processors, causes the one or more processors to perform the method recited in claim 10.

21. The method of claim 1 further comprising the steps of:
   while storing said entries in said plurality of partitions, and in response to filling said volatile memory up to a particular threshold level,
   selecting a first partition, from said plurality of partitions, to store persistently, and
   storing said first partition persistently, while continuing to store entries associated with said data items in partitions from said plurality of partitions in volatile memory.

22. A machine-readable storage medium storing one or more sequences of instructions which, when executed by one or more processors, causes the one or more processors to perform the method recited in claim 21.

23. The method of claim 1, wherein generating another measure value further comprises adding said first measure value for aggregation with said second measure value.

24. A machine-readable storage medium storing one or more sequences of instructions which, when executed by one or more processors, causes the one or more processors to perform the method recited in claim 23.

* * * * *

UNITED STATES PATENT AND TRADEMARK OFFICE
CERTIFICATE OF CORRECTION

PATENT NO. : 7,469,241 B2  Page 1 of 1
APPLICATION NO. : 11/156068
DATED : December 23, 2008
INVENTOR(S) : Bellamkonda et al.

It is certified that error appears in the above-identified patent and that said Letters Patent is hereby corrected as shown below:

On the Title Page On page 2, Item (56) under "Other Publications", line 1, delete "Oracle8/Data" and insert -- Oracle8i Data --, therefor.

In column 6, line 21, delete "GROUPBY" and insert -- GROUP BY --, therefor.

In column 13, line 33, delete "procesing" and insert -- processing --, therefor.

Signed and Sealed this

Twentieth Day of April, 2010

David J. Kappos
*Director of the United States Patent and Trademark Office*